United States Patent
Shimizu (10) Patent No.: US 7,683,955 B2
(45) Date of Patent: Mar. 23, 2010

(54) PHOTOCURRENT SENSING CIRCUIT CONVERTING AN ILLUMINATION OF VISIBLE LIGHT INTO AN ELECTRIC SIGNAL AS WELL AS PHOTOSENSOR AND ELECTRONIC DEVICE WITH THE PHOTOCURRENT SENSING CIRCUIT

(75) Inventor: Takayuki Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

(21) Appl. No.: 11/907,597

(22) Filed: Oct. 15, 2007

(65) Prior Publication Data

US 2008/0106918 A1   May 8, 2008

(30) Foreign Application Priority Data

Nov. 8, 2006   (JP) .................... 2006-303062

(51) Int. Cl.
*H04N 3/14*   (2006.01)
(52) U.S. Cl. .................. 348/308; 354/427; 323/907
(58) Field of Classification Search ......... 307/297, 307/357, 491; 323/907, 312–316; 354/44, 354/427, 459; 348/297, 308, 300, 301, 222.01
See application file for complete search history.

(56) References Cited

U.S. PATENT DOCUMENTS

| | | | |
|---|---|---|---|
| 4,072,962 A * | 2/1978 | Maida ...................... 396/228 |
| 5,130,563 A * | 7/1992 | Nabet et al. .................. 706/40 |
| 5,515,260 A | 5/1996 | Watanabe et al. |
| 5,619,262 A * | 4/1997 | Uno .......................... 348/297 |
| 5,693,934 A * | 12/1997 | Hohmoto et al. ........ 250/214 A |
| 6,741,282 B1 * | 5/2004 | Morris ....................... 348/308 |
| 7,397,021 B2 * | 7/2008 | Shibata ..................... 250/238 |

FOREIGN PATENT DOCUMENTS

| | | |
|---|---|---|
| JP | 64-10707 A | 1/1989 |
| JP | 64-41508 A | 2/1989 |
| JP | 64-61107 A | 3/1989 |
| JP | 3-165609 A | 7/1991 |
| JP | 08-065074 A | 3/1996 |
| JP | 08-340128 A | 12/1996 |
| JP | 10-021314 A | 1/1998 |
| JP | 2006-133942 A | 5/2006 |

* cited by examiner

*Primary Examiner*—Rajnikant B Patel
(74) *Attorney, Agent, or Firm*—Birch, Stewart, Kolasch & Birch LLP (57) ABSTRACT

A photocurrent sensing circuit includes a logarithmic compression circuit; a cancellation circuit logarithmically compressing a current substantially equal in temperature coefficient of the photocurrent to convert the same into a voltage, and performing an addition or a subtraction on the converted voltage and a voltage converted from a photocurrent by logarithmically compression; a logarithmic operation circuit logarithmically compressing the voltage received from the cancellation circuit to produce a first voltage, logarithmically compressing a voltage proportional to a thermal voltage of the photocurrent to produce a second voltage, logarithmically compressing a current having thermal dependence of nearly zero to produce a third voltage and performing an addition or a subtraction of each of the second and third voltages with respect to the first voltage to produce a fourth voltage; and an inverse logarithmic transformation circuit performing inverse logarithmic transformation on the fourth voltage to output a current.

12 Claims, 5 Drawing Sheets

PHOTOCURRENT SENSING CIRCUIT CONVERTING AN ILLUMINATION OF VISIBLE LIGHT INTO AN ELECTRIC SIGNAL AS WELL AS PHOTOSENSOR AND ELECTRONIC DEVICE WITH THE PHOTOCURRENT SENSING CIRCUIT

This nonprovisional application is based on Japanese Patent Application No. 2006-303062 filed with the Japan Patent Office on Nov. 8, 2006, the entire contents of which are hereby incorporated by reference.

BACKGROUND OF THE INVENTION

1. Field of the Invention

The present invention relates to a photocurrent sensing circuit converting an illumination of visible light into an electric signal as well as a photosensor and an electronic device that are provided with the photocurrent sensing circuit, and particularly to a photocurrent sensing circuit that has spectral sensitivity characteristics close to human visual sensitivity characteristics as well as a photosensor and an electronic device provided with the same.

2. Description of the Background Art

As typical examples of photosensors for visible light, there are two kinds of sensors of silicon photodiodes and CdS (Cadmium Sulfide) cells are. Since the silicon photodiode has small sizes, high responsibility and high stability, it is widely used in light receiving elements for optical communications and optical disks as well as photosensors and others. However, spectral sensitivity characteristics of the silicon photodiode significantly differ from human visual sensitivity characteristics in that the sensitivity in the infrared range is high. Conversely, the CdS cell has the spectral sensitivity characteristics close to the human visual sensitivity characteristics. Therefore, the CdS cells have been used in exposure meters of cameras and visual light sensors for long years.

In recent years, there has been a problem relating to use and the like of substances causing high environmental loads, and restrictions are being introduced on use of the CdS cells containing cadmium sulfide as a major component. For example, Europe has inhibited the bringing in of products using cadmium, lead, hexavalent chromium or mercury since July 2006. Conversely, the silicon causes a less environmental load than the cadmium sulfide. Therefore, it has been increasingly demanded to provide a sensor that is formed of a silicon photodiode, and has the spectral sensitivity characteristics close to the human visual sensitivity characteristics.

In recent years, it has been increasingly demanded to provide illumination sensors that have the spectral sensitivity characteristics close to the human visual sensitivity characteristics for using them as sensors that automatically adjust a brightness of a backlight such as a cellular phone, a LCTV (Liquid Crystal Television) or the like according to an ambient brightness for suppressing power consumption of a battery of the cellular phone and improving visibility of a liquid crystal display.

For suppressing exhaustion of a battery, it is also necessary to reduce power consumption of an illumination sensor itself. In general, the output of the illumination sensor is proportional to a quantity of incident light. When light of a high illumination such as direct sunlight illumination enters the sensor, it outputs a current of several milliamperes or more, and this affects a battery life. In recent years, therefore, the cellular phones and mobile terminals have employed a logarithmic current output type of illumination sensors that include a circuit performing logarithmic transformation of an incident light quantity (e.g., see Japanese Patent Laying-Open Nos. 08-065074, 08-340128, 10-021314 and 2006-133942) and thereby suppress current consumption over a wide range from low to high illuminations. For finely controlling backlight illuminating of the liquid crystal panel, it is also required to achieve accurate output of the illumination sensor and to improve the temperature characteristics thereof.

Figure 7:
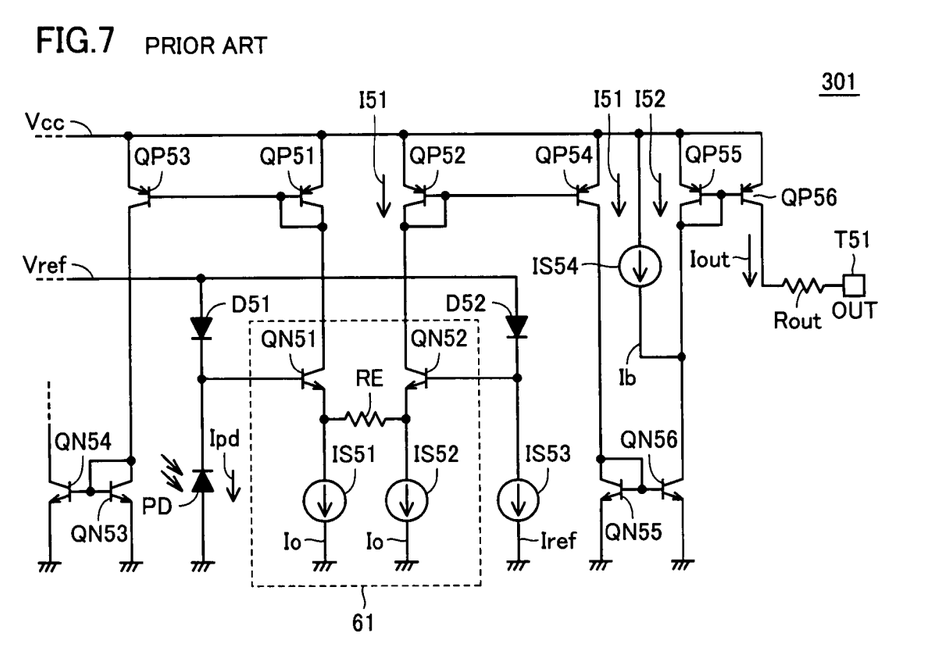
FIG. 7 is a circuit diagram showing a structure of an conventional photocurrent sensing circuit.

FIG. 7 is a circuit diagram showing a structure of a conventional photocurrent sensing circuit.

Referring to FIG. 7, a photocurrent sensing circuit 301 includes a light receiving element PD, PNP transistors QP51-QP56, NPN transistors QN51-QN56, diodes D51 and D52, constant current supply circuits IS51-IS54, resistances RE and Rout, and an output terminal T51. NPN transistors QN51 and QN52, resistance RE and constant current supply circuits IS51 and IS52 form a transconductance amplifier 61.

Photocurrent sensing circuit 301 performs logarithmic transformation on the photocurrent of light receiving element PD to provide an output current Iout. More specifically, when light receiving element PD receives the light, a photocurrent Ipd proportional to the quantity of received light flows through light receiving element PD. Diode D51 coverts it into a logarithmically compressed voltage. A voltage VD1 between the opposite ends of diode D51 is expressed by the following equation:

$$VD1 = Vt \times \ln(Ipd/Is)$$

where Vt represents a thermal voltage of diode D51 expressed by $(k \times T/q)$, k represents a Boltzmann's constant, T represents an absolute temperature, q represents an elementary charge, i.e., quantum of electricity and Is represents a reverse saturation current of diode D51. ln represents a natural logarithm.

Diode D52 converts a reference current Iref provided from constant current supply circuit IS53 into a logarithmically compressed voltage. A voltage VD2 between the opposite ends of diode D52 is expressed by the following equation:

$$VD2 = Vt \times \ln(Iref/Is)$$

Voltages VD1 and VD2 are provided to bases of NPN transistors QN51 and QN52 of transconductance amplifier 61, respectively. The bases of NPN transistors QN51 and QN52 provide differential inputs to transconductance amplifier 61. A voltage difference $\Delta VD$ between voltages VD1 and VD2 is expressed by the following equation:

$$\Delta VD = VD1 - VD2$$
$$= Vt \times \ln(Ipd/Is) - Vt \times \ln(Iref/Is)$$
$$= Vt \times \ln(Ipd/Iref)$$

Transconductance amplifier 61 converts voltage difference $\Delta VD$ into a current. A transconductance gm of transconductance amplifier 61 is expressed by the following equation, where RE represents a resistance value of resistance RE, and Io represents an output current value of constant current supply circuits IS51 and IS52.

$$gm = 1/(2 \times Vt/Io + RE)$$

Therefore, a collector current I51 of NPN transistor QN52 is expressed by the following equation:

$$I51 = Io + gm \times \Delta VD$$
$$= Io + Vt \times \ln(Ipd/Iref)/(2 \times Vt/Io + RE)$$

When $(2 \times Vt/Io \ll RE)$ is satisfied, collector current I51 of NPN transistor QN52 is expressed by the following equation:

$$I51 \approx Io + Vt \times \ln(Ipd/Iref)/RE$$

A current mirror circuit formed of PNP transistors QP52 and QP54 as well as a current mirror circuit formed of NPN transistors QN55 and QN56 change the current direction of collector current I51 of NPN transistor QN52, i.e., an output current I1 of the transconductance amplifier, and an output current Ib of constant current supply circuit IS54 having the same temperature coefficient as output current Io of constant current supply circuits IS51 and IS52 is subtracted from this collector current I51. Thereby, collector current I52 of PNP transistor QP55 is expressed by the following formula:

$$I52 = I51 - Ib$$
$$= Io - Ib + Vt \times \ln(Ipd/Iref)/RE$$

When PNP transistors QP55 and QP56 have the same emitter areas, output current Iout of photocurrent sensing circuit 301 is expressed by the following equation:

$$Iout = I52$$
$$= Io - Ib + Vt \times \ln(Ipd/Iref)/RE$$

For providing output current Iout of photocurrent sensing circuit 301 equal to $(10 \times \log(\text{illumination}))$, output current Ib of constant current supply circuit IS54 is determined in the following manner, where log represents a logarithmic using base 10.

When the illumination is 1 lux, output current Iout is expressed by the following equation where Ipd_1lx represents photocurrent Ipd of light receiving element PD.

$$Iout = Io - Ib + (Vt/RE) \times ((\ln(Ipd/Ipd\_1lx) + \ln(Ipd\_1lx/Iref))$$

The transformation equation of the base of ln and the base of log is as follows:

$$\ln(X) = \log(X)/\log(e) \approx 2.3025 \times \log(X)$$

Therefore, output current Iout is expressed by the following formula:

$$Iout = Io - Ib + (Vt/RE) \times (2.3025 \times \log(Ipd/Ipd\_1lx) - \ln(Iref/Ipd\_1lx))$$

Assuming that Ev represents the illumination of the incident light of light receiving element PD, a relationship of $(Ev = Ipd/Ipd\_1lx)$ is satisfied so that output current Iout is expressed by the following equation:

$$Iout = Io - Ib + (Vt/RE) \times (2.3025 \times \log(Ev) - \ln(Iref/Ipd\_1lx))$$
$$= (Vt/RE) \times (2.3025 \times \log(Ev) - \ln(Iref/Ipd\_1lx) + (RE/Vt) \times (Io - Ib))$$

When Io, Ib and RE are appropriately determined to satisfy the relationships of:

$$(RE/Vt) \times (Io - Ib) - \ln(Iref/Ipd\_1lx) = 0, \text{ and}$$

$$(Vt/RE) \times 2.3025 = 10$$

output current Iout is expressed by the following equation:

$$Iout = 10 \times \log(Ev)$$

Therefore, output current Iout can be set ten times larger than the logarithmic value of the illumination.

Constant current supply circuits IS51-IS54 are band gap current supplies, respectively, and reference current Iref and output currents Io and Ib are expressed by the following equations, respectively.

$$I = Vt \times \ln(10)/R$$

Temperature coefficients of thermal voltage Vt and a resistance value R may be equal to each other, whereby temperature-changes in output currents Io and Ib can be small.

Output current Iout is expressed by the following equation:

$$Iout = N \times (Io - Ib + Vt \times \ln(Ipd/Iref)/RE)$$

where N represents an amplification factor of PNP transistor QP56.

Therefore, by employing such a configuration that the temperature coefficient of resistance value RE is equal to that of thermal voltage Vt of diode D51, the temperature-changes in output current Iout can be small.

A temperature coefficient $\alpha$ of thermal voltage Vt of diode D51 is expressed by the following equation:

$$\alpha = (\partial Vt/\partial T)/Vt$$

Since Vt is equal to kT/q (Vt=kT/q), $\alpha$ is expressed by the following equation:

$$\alpha = 1/T$$

When the temperature is, e.g., 27° C.(=300 (K) in absolute temperature T), temperature coefficient $\alpha$ of thermal voltage Vt is equal to 3333 ppm/deg.C. Even when the temperature coefficient of resistance RE at 27° C. is set to 3333 ppm/deg.C., the temperature may deviates from 27° C., and resistance RE was produced using an ordinary semiconductor process. In this case, a difference occurs in temperature coefficient between thermal voltage Vt and resistance RE so that temperature-changes in output current Iout occur. Further, for providing thermal voltage Vt and resistance RE having the temperature coefficients equal to each other, it is necessary to integrate a special temperature measuring resistance having the same temperature coefficient as thermal voltage Vt over a wide temperature range, which increases a manufacturing cost of the photocurrent sensing circuit.

SUMMARY OF THE INVENTION

An object of the invention is to provide a photocurrent sensing circuit that suppresses temperature-changes in output current and can reduce a cost as well as a photosensor and an electronic circuit that are provided with the same.

A photocurrent sensing circuit according to an aspect of the invention includes a first logarithmic compression circuit including a diode, and logarithmically compressing a photocurrent received from a light receiving element to convert the photocurrent into a voltage using the diode; a cancellation circuit logarithmically compressing a current substantially equal in temperature coefficient of the photocurrent to convert the current into a voltage, and performing an addition or a subtraction on the converted voltage and the voltage converted by the first logarithmic compression circuit to output a resultant voltage; a logarithmic operation circuit logarithmically compressing the resultant voltage received from the cancellation circuit to produce a first voltage, logarithmically compressing a voltage proportional to a thermal voltage of the photocurrent to produce a second voltage, logarithmically compressing a current having thermal dependence of nearly zero to produce a third voltage and performing an addition or a subtraction of each of the second and third voltages with respect to the first voltage to produce a fourth voltage; and an inverse logarithmic transformation circuit performing inverse logarithmic transformation on the fourth voltage to output a current.

Preferably, the cancellation circuit includes a first current supply circuit producing a reference current having a temperature coefficient substantially equal to that of the photocurrent, a second logarithmic compression circuit logarithmically compressing the reference current to covert the reference current into a voltage, and a first operation circuit performing an addition or a subtraction on the voltage converted by the first logarithmic compression circuit and a voltage received from the second logarithmic compression circuit.

More preferably, the cancellation circuit further includes a first voltage supply circuit producing a voltage proportional to the thermal voltage of the diode. The first operation circuit performs an addition or a subtraction on the voltage converted by the second logarithmic compression circuit and the voltage proportional to the thermal voltage of the diode, and performs an addition or a subtraction on a result of the addition or the subtraction and the voltage converted by the first logarithmic compression circuit.

More preferably, the first current supply circuit can adjust a current value of the reference current by performing trimming.

Preferably, the logarithmic operation circuit includes a third logarithmic compression circuit logarithmically compressing the resultant voltage received from the cancellation circuit to produce the first voltage, a second voltage supply circuit producing a voltage proportional to the thermal voltage of the diode, a current converting circuit converting the voltage produced by the second voltage supply circuit into a current, a fourth logarithmic compression circuit logarithmically compressing the current converted by the current converting circuit to convert the converted current into the second voltage, a second operation circuit performing an addition or a subtraction on the first voltage produced by the third logarithmic compression circuit and the second voltage converted by the fourth logarithmic compression circuit to output a resultant voltage, a second current supply circuit producing a current having a temperature coefficient of nearly zero, a fifth logarithmic compression circuit logarithmically compressing the current produced by the second current supply circuit to convert the produced current into the third voltage, and a third operation circuit performing an addition or a subtraction on the resultant voltage received from the second operation circuit and the third voltage converted by the fifth logarithmic compression circuit to produce the fourth voltage.

More preferably, the second current supply circuit includes a third voltage supply circuit producing a voltage, and a resistance converting the voltage produced by the third voltage supply circuit into a current, and the temperature coefficient of the voltage produced by the third voltage supply circuit is substantially equal to the temperature coefficient of the resistance.

More preferably, the resistance value of the resistance can be adjusted by trimming.

Preferably, the logarithmic operation circuit includes an inclination adjusting circuit adjusting a degree of change in the output current of the inverse logarithmic transformation circuit with respect to changes in the photocurrent.

Preferably, the inverse logarithmic transformation circuit includes a diode, an operational amplifier receiving on its first input terminal the fourth voltage from the logarithmic operation circuit, and a transistor receiving on its control electrode an output of the operational amplifier and connected at one of its conductive electrodes to the diode and a second input terminal of the operational amplifier.

Preferably, the first logarithmic compression circuit includes an operational amplifier, the cancellation circuit includes a voltage supply circuit, a current supply circuit and an operational amplifier, and the logarithmic operation circuit includes a voltage supply circuit, a current supply circuit and an operational amplifier. A reference voltage of each of the operational amplifiers, the voltage supply circuits and the current supply circuits is a voltage other than a ground voltage. The photocurrent sensing circuit further includes a reference voltage cancellation circuit subtracting the reference voltage from the fourth voltage produced by the logarithmic operation circuit to output a resultant voltage to the inverse logarithmic transformation circuit. The inverse logarithmic transformation circuit performs inverse logarithmic transformation on the resultant voltage received from the reference voltage cancellation circuit to output the current.

A photosensor according to an aspect of the invention includes a light receiving element outputting a photocurrent depending on a quantity of received light, and a photocurrent sensing circuit. The photocurrent sensing circuit includes a first logarithmic compression circuit including a diode, and logarithmically compressing the photocurrent received from the light receiving element to convert the photocurrent into a voltage using the diode; a cancellation circuit logarithmically compressing a current substantially equal in temperature coefficient of the photocurrent to convert the current into a voltage, and performing an addition or a subtraction on the converted voltage and the voltage converted by the first logarithmic compression circuit to output a resultant voltage; a logarithmic operation circuit logarithmically compressing the resultant voltage received from the cancellation circuit to produce a first voltage, logarithmically compressing a voltage proportional to a thermal voltage of the photocurrent to produce a second voltage, logarithmically compressing a current having thermal dependence of nearly zero to produce a third voltage and performing an addition or a subtraction of each of the second and third voltages with respect to the first voltage to produce a fourth voltage; and an inverse logarithmic transformation circuit performing inverse logarithmic transformation on the fourth voltage to output a current.

An electronic device according to an aspect of the invention includes a light receiving element outputting a photocurrent depending on a quantity of received light, and a photocurrent sensing circuit. The photocurrent sensing circuit includes a first logarithmic compression circuit including a diode, and logarithmically compressing the photocurrent received from the light receiving element to convert the photocurrent into a voltage using the diode; a cancellation circuit logarithmically compressing a current substantially equal in temperature coefficient of the photocurrent to convert the current into a voltage, and performing an addition or a subtraction on the converted voltage and the voltage converted by the first logarithmic compression circuit to output a resultant voltage; a logarithmic operation circuit logarithmically compressing the resultant voltage received from the cancellation circuit to produce a first voltage, logarithmically compressing a voltage proportional to a thermal voltage of the photocurrent to produce a second voltage, logarithmically compressing a current having thermal dependence of nearly zero to produce a third voltage and performing an addition or a subtraction of each of the second and third voltages with respect to the first voltage to produce a fourth voltage; and an inverse logarithmic transformation circuit performing inverse logarithmic transformation on the fourth voltage to output a current.

The invention can suppress temperature-changes in output current and can reduce a cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the figures, the same or corresponding portions bear the same reference numbers, and description thereof is not repeated.

First Embodiment

Figure 1:
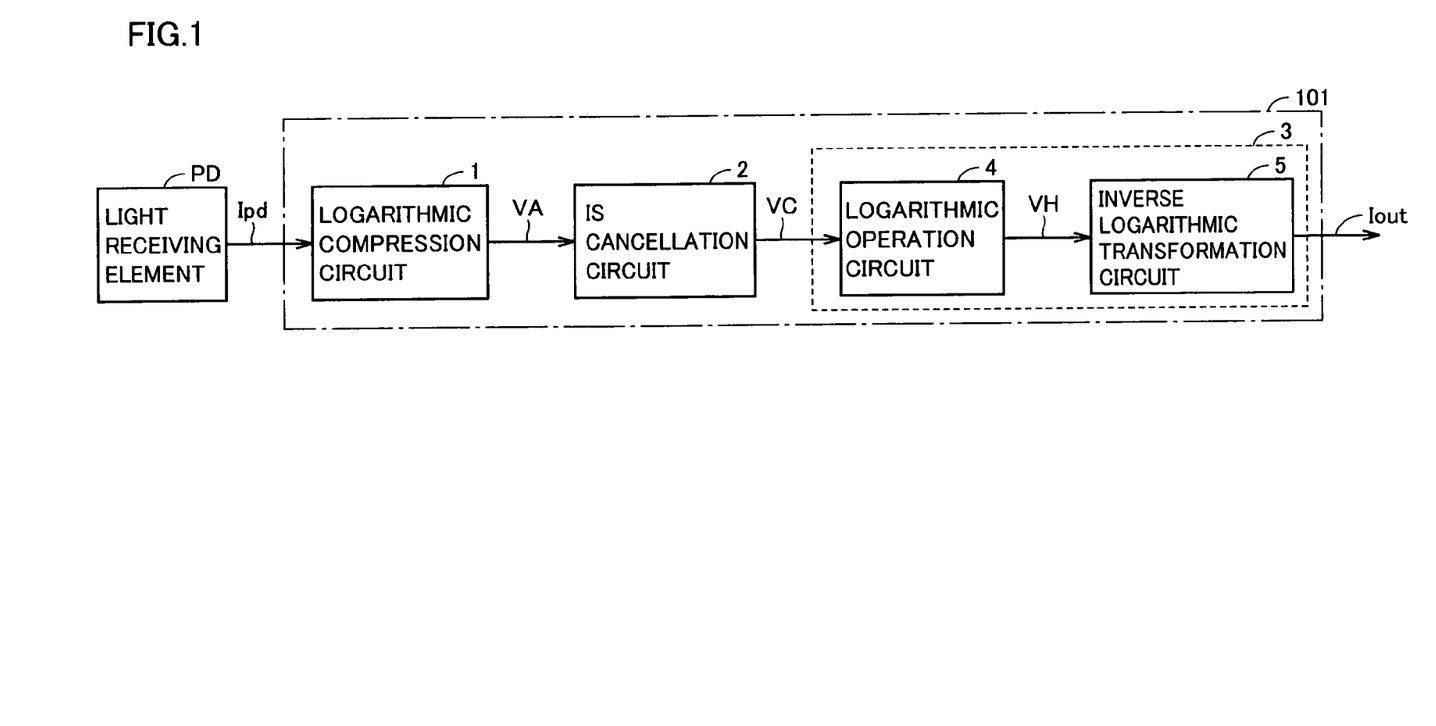
FIG. 1 is a block diagram showing a structure of a photocurrent sensing circuit according to a first embodiment of the invention.

FIG. 1 is a block diagram showing a structure of a photocurrent sensing circuit according to a first embodiment of the invention.

Referring to FIG. 1, a photocurrent sensing circuit 101 includes a logarithmic compression circuit (first logarithmic compression circuit) 1, an Is cancellation circuit 2 and a Vt cancellation circuit 3. Vt cancellation circuit 3 includes a logarithmic operation circuit 4 and an inverse logarithmic transformation circuit 5. Voltages VA-VH to be described below correspond to voltages Va-Vh in a photocurrent sensing circuit according to a second embodiment of the invention, respectively.

A light receiving element PD receives external light to output a photocurrent Ipd proportional to a quantity of the received light.

Logarithmic compression circuit 1 includes a diode DA (not shown), logarithmically compresses photocurrent Ipd received from light receiving element PD using diode DA and thereby converts it into a voltage VA. When Vt represents a thermal voltage of diode DA, and Is represents a reverse saturation current of diode DA, voltage VA is expressed by the following formula:

$$VA = Vt \times \ln(Ipd/Is)$$

It can be understood that temperature-change in voltage VA is large because voltage VA contains thermal voltage Vt and reverse saturation current Is that have large thermal dependences.

Is cancellation circuit 2 produces a reference current Iref1 having the same temperature coefficient as an output current Ipd of light receiving element PD. Is cancellation circuit 2 logarithmically compresses reference current Iref1 to convert it into a voltage VB. Is cancellation circuit 2 performs a subtraction on voltages VA and VB to provide a result of the subtraction as an output voltage VC. Output voltage VC of Is cancellation circuit 2 is expressed by the following equation:

$$VC = Vt \times \ln(Ipd/Is) - Vt \times \ln(Iref1/Is)$$
$$= Vt \times \ln(Ipd/Iref1)$$

Therefore, it can be understood that Is cancellation circuit 2 can cancel a component corresponding to reverse saturation current Is at voltage VA.

Logarithmic operation circuit 4 logarithmically compresses output voltage VC received from Is cancellation circuit 2 to convert it into a voltage (first voltage) VD. Logarithmic operation circuit 4 produces a voltage proportional to a thermal voltage Vt, converts the produced voltage into a current and logarithmically compresses the converted current into a voltage (second voltage) VE. Logarithmic operation circuit 4 performs a subtraction on voltages VD and VE to produce a voltage VF, which is expressed by the following equation:

$$VF = Vt \times \ln(\ln(Ipd/Iref1))$$

Logarithmic operation circuit 4 produces a reference current Iref2 having no temperature dependence. Logarithmic operation circuit 4 logarithmically compresses reference current Iref2 to convert it into a voltage (third voltage) VG. Voltage VG is expressed by the following equation:

$$VG = Vt \times \ln(Iref2/Is)$$

Logarithmic operation circuit 4 performs an addition on voltages VF and VG, and provides a result of the addition as an output voltage (fourth voltage) VH. Output voltage (fourth voltage) VH of the logarithmic operation circuit is expressed by the following equation:

$$VH = Vt \times \ln((Iref2/Is) \times \ln(Ipd/Iref1))$$

Inverse logarithmic transformation circuit 5 performs inverse logarithmic transformation on output voltage VH received from logarithmic operation circuit 4 to produce an output current Iout, and externally provides output current Iout. Output current Iout is expressed by the following equation:

$$Iout = Iref2 \times \ln(Ipd/Iref1)$$

By employing photocurrent Ipd and reference current Iref1 having the same temperature coefficient, the temperature coefficient of output current Iout can be set to zero. Thus, temperature-changes in output of photocurrent sensing circuit 101 can be suppressed.

When the conventional photocurrent sensing circuit shown in FIG. 7 has a resistance RE produced by an ordinary semiconductor process, a deviation occurs in temperature coefficient between thermal voltage Vt and resistance RE so that a temperature-change occurs in output current Iout. For matching the temperature coefficient of thermal voltage Vt with that of resistance RE, it is necessary to provide, in an integrated or packaged form, a special temperature measuring resistance that has the same temperature coefficient as that of thermal voltage Vt over a wide temperature range, and this increases a manufacturing cost of the photocurrent sensing circuit. However, in the photocurrent sensing circuit according to the first embodiment of the invention, logarithmic compression circuit 1 includes diode DA, and converts the photocurrent received from light receiving element PD into a voltage by logarithmically compressing it using diode DA. Is cancellation circuit 2 logarithmically compresses the current substantially equal to the temperature coefficient of the photocurrent to convert it into a voltage, and performs a subtraction on the voltage thus converted and the voltage received from logarithmic compression circuit 1. Logarithmic operation circuit 4 logarithmically compresses the voltage received from Is cancellation circuit 2 to produce voltage VD, logarithmically compresses the voltage proportional to the thermal voltage of the photocurrent to produce voltage VE, logarithmically compresses the current having the temperature dependence of nearly zero to produce voltage VG, subtracts voltage VE from voltage VD and adds a result of this subtraction to voltage VG to produce voltage VH. Inverse logarithmic transformation circuit 5 performs the inverse logarithmic transformation on voltage VH to provide output current Iout. This structure can suppress the temperature-change in output current Iout. It is not necessary to employ the special temperature measuring resistance that has the same temperature coefficient as thermal voltage Vt over a wide temperature range. Therefore, the cost can be reduced.

In the photocurrent sensing circuit according to the first embodiment of the invention, as described above, Is cancellation circuit 2 performs the subtraction on voltages VA and VB. Also, logarithmic operation circuit 4 performs the subtraction on voltages VD and VE to produce voltage VF, and adds voltage VF to voltage VG. However, these structures are not restrictive. Depending on the structures of the logarithmic compression circuit included in Is cancellation circuit 2 and logarithmic operation circuit 4, the logarithmically compressed voltage may be positive, and may also be negative. In the design stage, a structure of performing the addition or a structure of performing the subtraction is appropriately selected for each of Is cancellation circuit 2 and logarithmic operation circuit 4 so that the components corresponding to the thermal voltage of diode DA and the reverse saturation current may be cancelled in output current Iout of photocurrent sensing circuit 101.

Another embodiment of the invention will now be described with reference to the drawings. In the figures, the same or corresponding portions bear the same reference numbers, and description thereof is not repeated.

Second Embodiment

This embodiment relates to an example of a specific circuit structure of the photocurrent sensing circuit according to the first embodiment of the invention.

Figure 2:
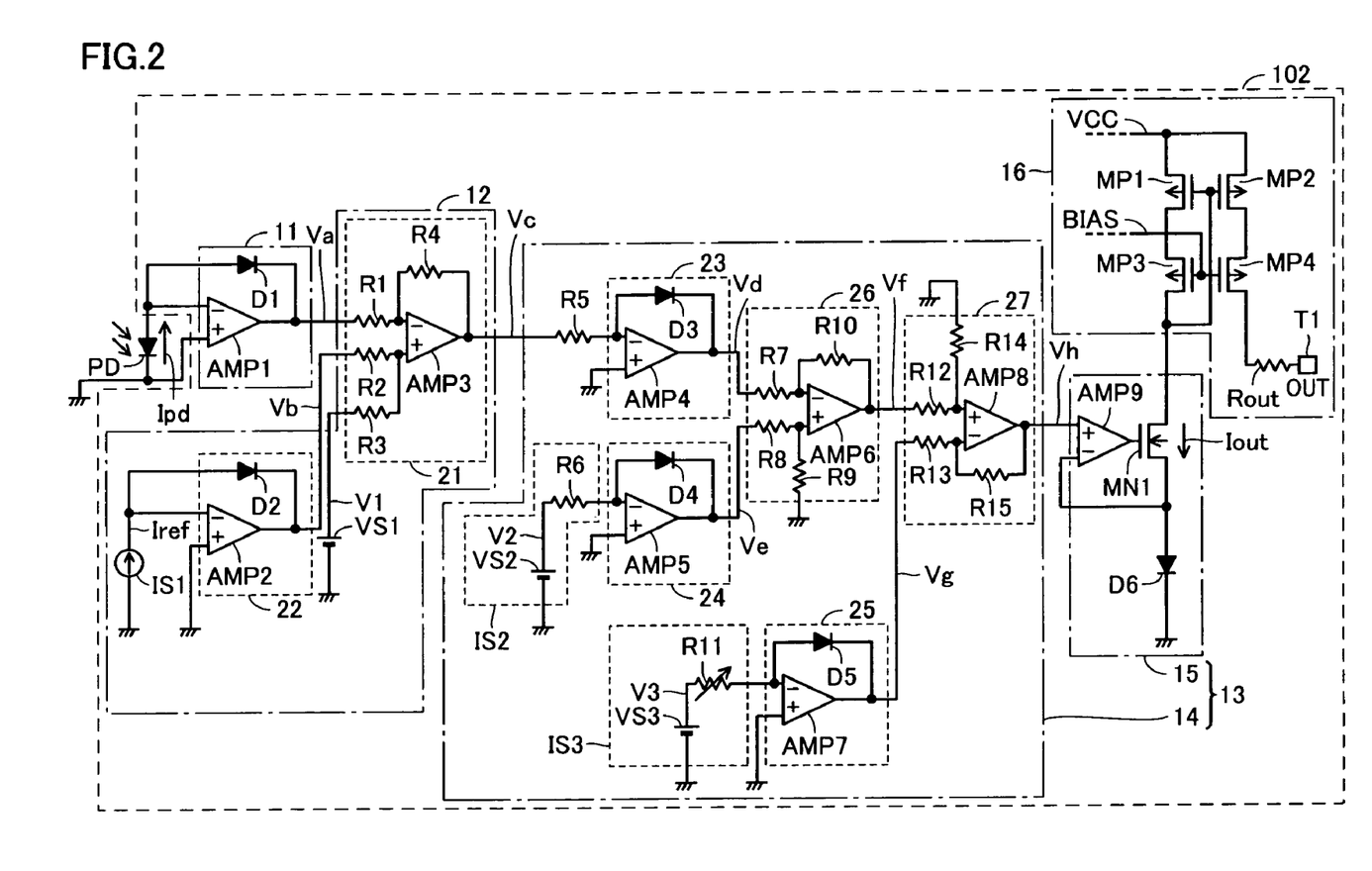
FIG. 2 is a circuit diagram showing a structure of a photocurrent sensing circuit according to a second embodiment of the invention.

FIG. 2 is a circuit diagram showing a structure of a photocurrent sensing circuit according to the second embodiment of the invention.

Referring to FIG. 2, a photocurrent sensing circuit 102 includes a logarithmic compression circuit (first logarithmic compression circuit) 11, an Is cancellation circuit 12, a Vt cancellation circuit 13 and an output circuit 16. Vt cancellation circuit 13 includes a logarithmic operation circuit 14 and an inverse logarithmic transformation circuit 15. Logarithmic compression circuit 11 includes a diode D1 and an operational amplifier AMP1.

Is cancellation circuit 12 includes an operation circuit (first operation circuit) 21, a logarithmic compression circuit (second logarithmic compression circuit) 22, a constant current supply circuit (first current supply circuit) IS1 and a constant voltage supply circuit (first voltage supply circuit) VS1. Operation circuit 21 includes resistances R1-R4 and an operational amplifier AMP3. Logarithmic compression circuit 22 includes a diode D2 and an operational amplifier AMP2.

Logarithmic operation circuit 14 includes a resistance R5, logarithmic compression circuits (third to fifth logarithmic compression circuits) 23-25, a constant current supply circuit IS2, a constant current supply circuit (second current supply circuit) IS3 and operation circuits (second and third operation circuits) 26 and 27. Logarithmic compression circuit 23 includes a diode D3 and an operational amplifier AMP4. Logarithmic compression circuit 25 includes a diode D5 and an operational amplifier AMP7. Operation circuit 26 includes resistances R7-R10 and an operational amplifier AMP6. Operation circuit 27 includes resistances R12-R15 and an operational amplifier AMP8. Constant current supply circuit IS2 includes a constant voltage supply circuit (second voltage supply circuit) VS2 and a resistance (current converter circuit) R6. Constant current supply circuit IS3 includes a constant voltage supply circuit (third voltage supply circuit) VS3 and a resistance (inclination adjusting circuit) R11.

Inverse logarithmic transformation circuit 15 includes an operational amplifier AMP9, a diode D6 and an N-channel MOS (Metal Oxide Semiconductor) transistor MN1.

Output circuit 16 includes an output terminal T1, an output resistance Rout and P-channel MOS transistors MP1-MP4.

Light receiving element PD converts externally incident light into a current. Thus, photocurrent Ipd proportional to the quantity of received light of light receiving element PD occurs.

[Logarithmic Compression Circuit 11]

Logarithmic compression circuit 11 logarithmically compresses photocurrent Ipd received from light receiving element PD to convert it into voltage Va, and provides voltage Va to Is cancellation circuit 12. Voltage Va is expressed by the following equation:

$$Va = -VT \times \ln(Ipd/Is)$$

where Vt represents a thermal voltage of diode D1 expressed by $(k \times T/q)$, k represents a Boltzmann's constant, T represents an absolute temperature, q represents an elementary charge, i.e., quantum of electricity and Is represents a reverse saturation current of diode D1. ln represents a natural logarithm.

[Is Cancellation Circuit 12]

Constant current supply circuit IS1 produces a reference current Iref having substantially the same temperature coefficient as photocurrent Ipd, and provides it to logarithmic compression circuit 22. Reference current Iref corresponds to reference current Iref1 in the photocurrent sensing circuit according to the first embodiment of the invention, and preferably has the same temperature coefficient as photocurrent Ipd.

Logarithmic compression circuit 22 logarithmically compresses reference current Iref received from constant current supply circuit IS1 to convert it into a voltage, and provides it as a voltage Vb to operation circuit 21. Voltage Vb is expressed by the following equation:

$$Vb = -Vt \times \ln(Iref/Is)$$

Constant voltage supply circuit VS1 produces a voltage V1 proportional to thermal voltage Vt of diode D1. Constant voltage supply circuit VS1 is employed for providing an offset in an output current IOUT. Voltage V1 is expressed by the following formula:

$$V1 = A \times Vt$$

A constant A is a real number larger than 0. As will be described later in detail, voltage V1 can be produced as follows. An output current of a band gap current supply is passed through a resistance having the same temperature coefficient as a reference resistance of the bang gap current supply, and thereby voltage V1 can be produced between the opposite ends of this resistance.

Operation circuit 21 adds the output of logarithmic compression circuit 22 to voltage V1 proportional to thermal voltage Vt of the diode. Operation circuit 21 performs the subtraction on a result of the addition and the output of logarithmic compression circuit 11.

Assuming that resistances R1-R4 have the same resistance value R, an output voltage Vc of the addition/subtraction circuit is expressed by the following equation:

$$\begin{aligned} Vc &= -Va + Vb + V1 \\ &= Vt \times \ln(Ipd/Is) - Vt \times \ln(Iref/Is) + A \times Vt \\ &= Vt \times (\ln(Ipd/Iref) + A) \end{aligned}$$

As described above, the subtraction is performed on voltage Vb produced by logarithmically compressing reference current Iref and voltage Va produced by logarithmically compressing photocurrent Ipd, and thereby the term of reverse saturation current Is having a large temperature dependence can be cancelled.

[Logarithmic Operation Circuit 14]

Resistance R5 converts output voltage Vc received from operation circuit 21 into a current. Resistance R5 has a resistance value of Ra.

Logarithmic compression circuit 23 logarithmically compresses the current received from resistance R5 to convert it into voltage (first voltage) Vd. Voltage Vd is expressed by the following equation:

$$Vd = -Vt \times \ln((Vc/Ra)/Is)$$

Constant voltage supply circuit VS2 produces a voltage V2 proportional to thermal voltage Vt of diode D1. Voltage V2 is expressed by the following equation:

$$V2 = B \times Vt$$

where a constant B is a real number larger than 0. Resistance R6 converts voltage V2 received from constant voltage supply circuit VS2 into a current. Resistance R6 has a resistance value of Ra.

Logarithmic compression circuit 24 logarithmically compresses a current received from resistance R6 to convert it into voltage (second voltage) Ve, which is expressed by the following equation:

$$Ve = -Vt \times \ln((V2/Ra)/Is)$$

Operation circuit 26 performs a subtraction on the outputs of logarithmic compression circuits 23 and 24. Assuming that resistances R7-R10 have the same resistance value R, an output voltage Vf of operation circuit 26 is expressed by the following equation:

$$\begin{aligned} Vf &= -Vd + Ve \\ &= Vt \times \ln((Vc/Ra)/Is) - Vt \times \ln((V2/Ra)/Is) \\ &= Vt \times \ln(Vc/V2) \end{aligned}$$

Constant current supply circuit IS3 produces a current having a temperature coefficient of nearly zero. More specifically, voltage supply circuit VS3 produces a voltage having a temperature coefficient of nearly zero. Resistance R11 has a temperature coefficient of nearly zero, and converts the voltage received from voltage supply circuit VS3 into a current. It is assumed that resistance R11 has a resistance value of Rb. Such a configuration may be employed that the voltage produced by voltage supply circuit VS3 and resistance R11 have substantially the same temperature coefficient.

Constant current supply circuit IS3 can be achieved by using a structure similar to a band gap voltage supply to be described later.

Logarithmic compression circuit 25 logarithmically compresses the current received from resistance R11 to convert it into voltage (third voltage) Vg, which is expressed by the following equation:

$$Vg = -Vt \times \ln(V3/Rb)/Is)$$

Operation circuit 27 performs a subtraction on the output of operation circuit 26 and the output of logarithmic compression circuit 25. Assuming that resistances R12-R15 have the same resistance value R, output voltage (fourth voltage) Vh of operation circuit 27 is expressed by the following equation:

$$\begin{aligned} Vh &= Vf - Vg \\ &= Vt \times \ln(Vc/V2) + Vt \times \ln((V3/Rb)/Is) \\ &= Vt \times \ln((Vc/V2) \times (V3/Rb)/Is) \end{aligned}$$

[Inverse Logarithmic Transformation Circuit 15]

Operational amplifier AMP9 receives voltage Vh provided from operation circuit 27 on its noninverting input terminal (first input terminal). N-channel MOS transistor MN1 receives an output of operational amplifier AMP9 on its gate (control electrode), and has a source (conductive electrode) coupled to an anode of diode D6 and an inversion input terminal (second input terminal) of operational amplifier AMP9.

Operational amplifier AMP9, N-channel MOS transistor MN1 and diode D6 perform inverse logarithmic transformation on voltage Vh received from operation circuit 27 to produce output current Iout. Assuming that a current flowing through diode D6 is output current Iout, the following equation is established:

$$Vt \times \ln(Iout/Is) = Vh = Vt \times \ln((Vc/V2) \times (V3/Rb)/Is)$$

Therefore, output current Iout is expressed by the following equation:

$$\begin{aligned} Iout &= (Vc/V2) \times (V3/Rb) \\ &= (V3/(Rb \times B)) \times (\ln(Ipd/Iref) + A) \end{aligned}$$

Thus, output current Iout takes the value proportion to the logarithm of photocurrent Ipd.

As described above, voltage supply circuit VS3 and resistance R11 have the temperature coefficients substantially equal to zero, the output current of constant current supply circuit IS3, i.e., V3/Rb has the temperature coefficient of nearly zero. Owing to this structure, the temperature-change in output current Iout can be suppressed over a wide temperature range.

As described above, the temperature coefficient of the voltage produced by voltage supply circuit VS3 is substantially equal to that of resistance Rb over a wide temperature range, and this structure can likewise suppress the temperature-change in output current Iout over a wide temperature range.

Resistance R11 can adjust resistance value Rb by performing trimming. This structure can adjust the inclination of output current Iout in a graph, in which the abscissa gives Ipd on a logarithmic scale, and the ordinate gives output current Iout.

Constant voltage supply circuit VS1 can adjust constant A, i.e., the voltage value of voltage V1 by performing the trimming. This structure allows adjusting of a quantity of offset of output current Iout.

Current supply circuit IS1 can adjust the current value of reference current Iref by performing the trimming. This structure allows adjusting of the offset quantity of output current Iout.

Assuming that photocurrent Ipd of light receiving element PD is equal to Ipd_1lx when the illumination is 1 lux, output current Iout is expressed by the following equation:

$$Iout=(V3/(Rb\times B))\times(\ln(Ipd/Ipd\_1lx)+\ln(Ipd\_1lx/Iref)+A)$$

Bases of ln and log are transformed by the following equation:

$$\ln(X)=\log(X)/\log(e)\approx 2.3025\times\log(X)$$

Therefore, output current Iout is expressed by the following equation:

$$Iout=(V3/(Rb\times B))\times(2.3025\times\log(Ipb/Ipd\_1lx)+A-\ln(Iref/Ipd\_1lx))$$

Assuming that Ev indicates the illumination of incident light of light receiving element PD, a relationship of (Ev=Ipd/Ipd_1lx) is satisfied so that output current Iout is expressed by the following equation:

$$Iout=(V3/(Rb\times B))\times(2.3025\times\log(Ev)+A-\ln(Iref/Ipd\_1lx))$$

A, B and Rb are arbitrarily determined to satisfy the following relationships:

$$A-\ln(Iref/Ipd\_1lx)=0,\text{ and}$$

$$(V3/(Rb\times B))\times 2.3025=10$$

Thereby, output current Iout is expressed by the following equation:

$$Iout=10\ \text{Log}(Ev)$$

Therefore, output current Iout can be set ten times larger than the logarithmic value of the illumination.

[Output Circuit 16]

A current mirror circuit formed of P-channel MOS transistors MP1 and MP2 and a current mirror circuit formed of P-channel MOS transistors MP3 and MP4 are cascaded. These two current mirror circuits provide output current Iout in the reverse direction from output terminal T1.

P-channel MOS transistors MP2 and MP4 have the gate widths that are N times larger than those of P-channel MOS transistors MP1 and MP3, respectively, whereby a current of (N×Iout) can be provided from output terminal T1.

Accordingly, the photocurrent sensing circuit of the second embodiment of the invention can suppress the temperature-change in output current and can reduce a cost, similarly to the photocurrent sensing circuit according to the first embodiment of the invention.

Although the photocurrent sensing circuit according to the second embodiment of the invention has output circuit 16, this structure is not restrictive. Photocurrent sensing circuit 102 may not include output circuit 16, and may have a structure in which a drain of N-channel MOS transistor MN1 is connected to output terminal T1 for externally absorbing a current into photocurrent sensing circuit 102.

Still another embodiment of the invention will now be described with reference to the drawings. In the figures, the same or corresponding portions bear the same reference numbers, and description thereof is not repeated.

Third Embodiment

A third embodiment relates to a photocurrent sensing circuit that is different from the photocurrent sensing circuit of the second embodiment in reference voltages of the operational amplifier and the like. Details other than those described below are the same as those of the photocurrent sensing circuit according to the second embodiment.

Figure 3:
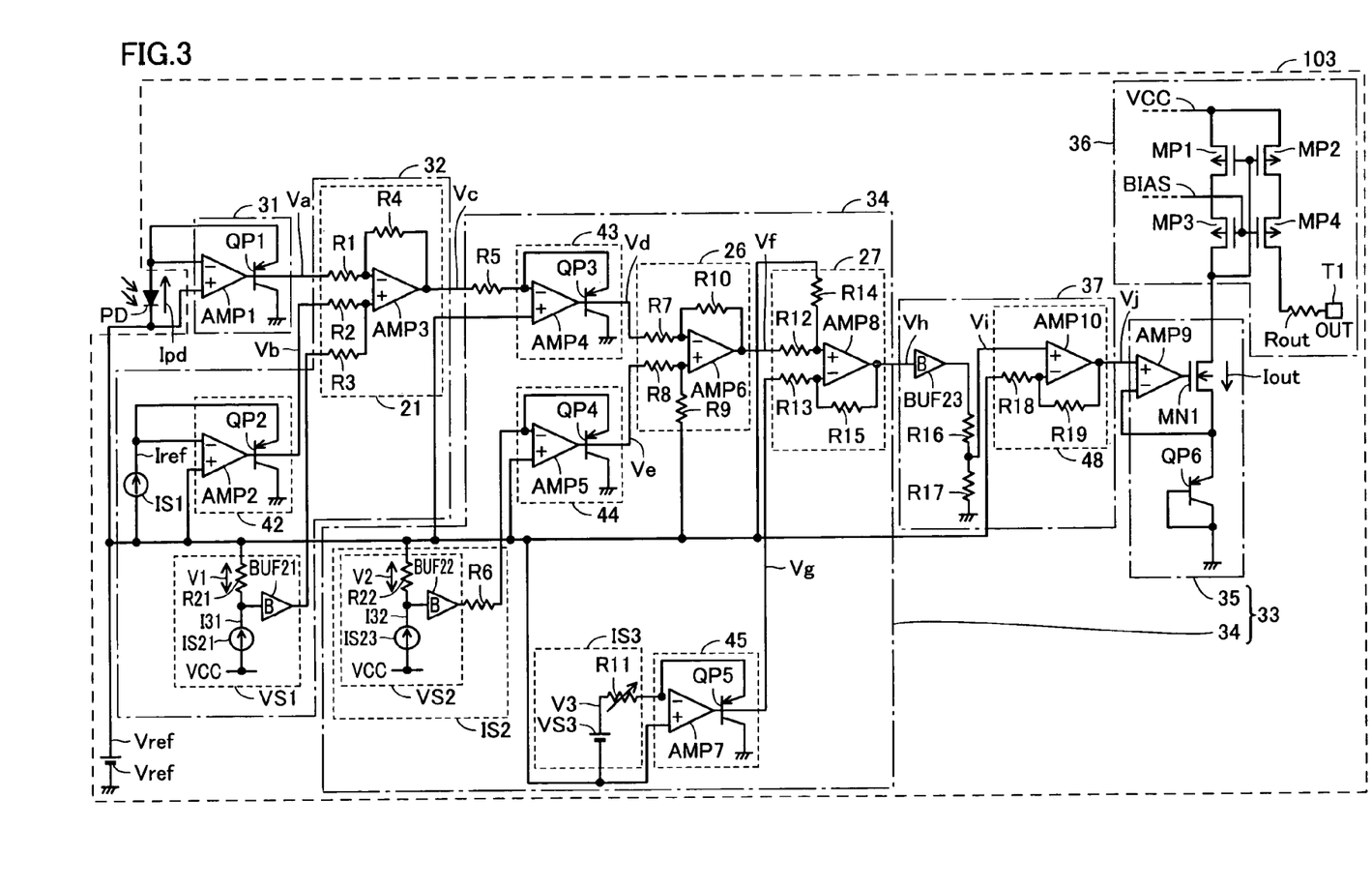
FIG. 3 is a circuit diagram showing a structure of the photocurrent sensing circuit according to a third embodiment of the invention.

FIG. 3 is a circuit diagram showing a structure of the photocurrent sensing circuit according to a third embodiment of the invention.

Referring to FIG. 3, a photocurrent sensing circuit 103 includes a logarithmic compression circuit (first logarithmic compression circuit) 31, an Is cancellation circuit 32, a Vt cancellation circuit 33, a Vref (reference voltage) cancellation circuit 37, an output circuit 36 and a reference voltage circuit VrefVt cancellation circuit 33 includes a logarithmic operation circuit 34 and an inverse logarithmic transformation circuit 35. Logarithmic compression circuit 31 includes a PNP transistor QP1 and operational amplifier AMP1.

Is cancellation circuit 32 includes operation circuit (first operation circuit) 21, a logarithmic compression circuit (second logarithmic compression circuit) 42, a constant current supply circuit (first current supply circuit) IS1 and a constant voltage supply circuit (first voltage supply circuit) VS1. Operation circuit 21 includes resistances R1-R4 and operational amplifier AMP3. Logarithmic compression circuit 42 includes a PNP transistor QP2 and operational amplifier AMP2. Constant voltage supply circuit VS1 includes a band gap current supply circuit IS21, a resistance R21 and a buffer BUF21.

Logarithmic operation circuit 34 includes resistance R5, logarithmic compression circuits (third to fifth logarithmic compression circuits) 43-45, constant current supply circuit IS2, constant current supply circuit (second current supply circuit) IS3, and operation circuits (second and third operation circuits) 26 and 27. Logarithmic compression circuit 43 includes a PNP transistor QP3 and operational amplifier AMP4. Logarithmic compression circuit 44 includes a PNP transistor QP4 and an operational amplifier AMP5. Logarithmic compression circuit 45 includes a PNP transistor QP5 and operational amplifier AMP7. Operation circuit 26 includes resistances R7-R10 and operational amplifier AMP6. Operation circuit 27 includes resistances R12-R15 and operational amplifier AMP8. Constant current supply circuit IS2 includes constant voltage circuit (second voltage supply circuit) VS2 and resistance (current converter circuit) R6. Constant current supply circuit IS3 includes constant voltage supply circuit (third voltage supply circuit) VS3 and resistance R11. Constant voltage supply circuit VS2 includes a band gap current supply circuit IS23, a resistance R22 and a buffer BUF22.

Inverse logarithmic transformation circuit 35 includes operational amplifier AMP9, a PNP transistor QP6 and N-channel MOS transistor MN1.

Output circuit 36 includes output resistance Rout and P-channel MOS transistors MP1-MP4, Vref cancellation circuit 37 includes a buffer BUF23, resistances R16 and R17, and an operation circuit 48. Operation circuit 48 includes an operational amplifier AMP10 and resistances R18 and R19.

PN junction diodes that are formed between emitters and bases of PNP transistors QP1-QP6 operate similarly to diodes D1-D6 in the photocurrent sensing circuit according to the second embodiment of the invention, respectively. Therefore, logarithmic compression circuits 31 and 42-45 as well as inverse logarithmic transformation circuit 35 are similar to those of the operations of logarithmic compression circuits 11 and 22-25 as well as inverse logarithmic transformation circuit 15 in the photocurrent sensing circuit according to the first embodiment of the invention. It should be noted that the photocurrent sensing circuit according to the second embodiment of the invention may have a structure in which PNP transistors QP1-QP6 are replaced with diodes D1-D6, respectively. A PN junction diode formed between the emitter and the base of PNP transistor PQ1 may also be referred to as a diode DB.

Reference voltage supply circuit Vref provides a voltage other than the ground voltage to various circuits as reference voltage Vref.

Light receiving element PD converts the external incident light into a current. Thus, it produces photocurrent Ipd proportional to the quantity of received light of light receiving element PD.

[Logarithmic Compression Circuit 31]

Logarithmic compression circuit 31 logarithmically compresses photocurrent Ipd received from light receiving element PD to convert it into a voltage, and provides it as voltage Va to Is cancellation circuit 32. Voltage Va is expressed by the following formula:

$$Va = Vref - Vt \times \ln(Ipd/Is)$$

where Vt represents a thermal voltage of diode DB expressed by (k×T/q), k represents a Boltzmann's constant, T represents an absolute temperature, q represents an elementary charge, i.e., quantum of electricity and Is represents a reverse saturation current of diode DB. ln represents a natural logarithm.

[Is cancellation circuit 32]

Constant current supply circuit IS1 produces reference current Iref having substantially the same temperature coefficient as photocurrent Ipd, and provides it to logarithmic compression circuit 42. Reference current Iref corresponds to reference current Iref1 in the photocurrent sensing circuit according to the first embodiment of the invention, and preferably has the same temperature coefficient as photocurrent Ipd.

Logarithmic compression circuit 42 logarithmically compresses reference current Iref received from constant current supply circuit IS1 to convert it into a voltage, and provides it as voltage Vb to operation circuit 21. Voltage Vb is expressed by the following equation:

$$Vb = Vref - Vt \times \ln(Iref/Is)$$

Constant voltage supply circuit VS1 produces voltage V1 proportional to thermal voltage Vt of diode DB. Constant voltage supply circuit VS1 is employed for providing an offset in output current IOUT. Voltage V1 is expressed by the following formula:

$$V1 = A \times Vt$$

Constant A is a real number larger than 0. As will be described later in detail, voltage V1 can be produced as follows. An output current of a band gap current supply is passed through a resistance having the same temperature coefficient as a reference resistance of the bang gap current supply, and thereby voltage V1 can be produced between the opposite ends of this resistance.

Operation circuit 21 adds the output of logarithmic compression circuit 42 to voltage V1 proportional to thermal voltage Vt of the diode. Operation circuit 21 performs the subtraction on a result of the addition and the output of logarithmic compression circuit 31.

Assuming that resistances R1-R4 have the same resistance value R, an output voltage Vc of the addition/subtraction circuit is expressed by the following equation:

$$\begin{aligned} Vc &= -Va + Vb + V1 \\ &= -(Vref - Vt \times \ln(Ipd/Is)) + (Vref - Vt \times \ln(Iref/Is)) + \\ &\quad (Vref + A \times Vt) \\ &= Vref + Vt \times (\ln(Ipd/Iref) + A) \end{aligned}$$

As described above, the subtraction is performed on voltage Vb produced by logarithmically compressing reference current Iref and voltage Va produced by logarithmically compressing photocurrent Ipd, and thereby the term of reverse saturation current Is having a large temperature dependence can be cancelled.

[Logarithmic Operation Circuit 34]

Resistance R5 converts output voltage Vc received from operation circuit 21 into a current. Resistance R5 has a resistance value of Ra.

Logarithmic compression circuit 43 logarithmically compresses the current received from resistance R5 to convert it into voltage (first voltage) Vd. Voltage Vd is expressed by the following equation:

$$Vd = Vref - Vt \times \ln(((Vc - Vref)/Ra)/Is)$$

Constant voltage supply circuit VS2 produces voltage V2 proportional to thermal voltage Vt of diode DB. Voltage V2 is expressed by the following equation:

$$V2 = B \times Vt$$

where constant B is a real number larger than 0. Resistance R6 converts voltage V2 received from constant voltage supply circuit VS2 into a current. Resistance R6 has a resistance value of Ra.

Logarithmic compression circuit 44 logarithmically compresses a current received from resistance R6 to convert it into voltage (second voltage) Ve, which is expressed by the following equation:

$$Ve = Vref - Vt \times \ln((V2/Ra)/Is)$$

Operation circuit 26 performs a subtraction on the outputs of logarithmic compression circuits 43 and 44. Assuming that resistances R7-R10 have the same resistance value R, output voltage Vf of operation circuit 26 is expressed by the following equation:

$$Vf = -Vd + Ve$$
$$= -(Vref - Vt \times \ln(((Vc - Vref)/Ra)/Is) +$$
$$(Vref - Vt \times \ln((V2/Ra)/Is))$$
$$= Vt \times \ln((Vc - Vref)/V2)$$

Constant current supply circuit IS3 produces a current having a temperature coefficient of nearly zero. More specifically, voltage supply circuit VS3 produces a voltage having a temperature coefficient of nearly zero. Resistance R11 has a temperature coefficient of nearly zero, and converts the voltage received from voltage supply circuit VS3 into a current. It is assumed that resistance R11 has a resistance value of Rb. Such a configuration may be employed that the voltage produced by voltage supply circuit VS3 and resistance R11 have substantially the same temperature coefficient.

Constant current supply circuit IS3 can be achieved by using a band gap voltage supply that provides an output voltage of the temperature coefficient of nearly zero and the resistance of the temperature coefficient of nearly zero.

Logarithmic compression circuit 45 logarithmically compresses the current received from resistance R11 to convert it into voltage (third voltage) Vg, which is expressed by the following equation:

$$Vg = Vref - Vt \times \ln((V3/Rb)/Is)$$

Operation circuit 27 performs a subtraction on the output of operation circuit 26 and the output of logarithmic compression circuit 45. Assuming that resistances R12-R15 have the same resistance value R, output voltage (fourth voltage) Vh of operation circuit 27 is expressed by the following equation:

$$Vh = Vf - Vg$$
$$= (Vt \times \ln((Vc - Vref)/V2) - (Vref - Vt \times \ln((V3/Rb)/Is))$$
$$= Vt \times \ln(((Vc - Vref)/V2) \times (V3/Rb)/Is) - Vref$$

[Vref Cancellation Circuit 37]

Resistances R16 and R17 divide voltage Vh that is received from operation circuit 27 via voltage buffer BUF23. Assuming that resistances R16 and R17 have resistance values of R, a voltage Vi is expressed by the following equation:

$$Vi = Vh/2$$
$$= (Vt \times \ln((Vc - Vref)/V2) \times (V3/Rb)/Is - Vref)/2$$

Operation circuit 48 performs a subtraction on voltage Vi and reference voltage Vref received from reference voltage circuit Vref, and provides a result of the subtraction to reference voltage cancellation circuit 37 as an output voltage Vj. Assuming that resistances R16 and R17 have the resistance value R, output voltage Vj is expressed by the following equation:

$$Vj = Vt \times \ln((Vc - Vref)/V2 \times (V3/Rb)/Is)$$

[Inverse Logarithmic Transformation Circuit 35]

Operational amplifier AMP9 receives voltage Vj from operation circuit 48 on its noninverting input terminal (first input terminal). N-channel MOS transistor MN1 receives on its gate (control electrode) an output of operational amplifier AMP9, and has a source (conductive electrode) coupled to an emitter of PNP transistor QP6 and an noninverting input terminal (second input terminal) of operational amplifier AMP9.

Operational amplifier AMP9, N-channel MOS transistor MN1 and PNP transistor QP6 perform inverse logarithmic transformation on voltage Vh received from reference voltage cancellation circuit 37, and thereby produces output current Iout. Assuming that output current Iout flows through diode D6, the following equation is established:

$$Vt \times \ln(Iout/Is) = Vj = Vt \times \ln(((Vc - Vref)/V2) \times (V3/Rb)/Is)$$

Therefore, output current Iout is expressed by the following equation:

$$Iout = ((Vc - Vref)/V2) \times (V3/Rb)$$
$$= (V3/(Rb \times B)) \times (\ln(Ipd/Iref) + A)$$

Thus, output current Iout takes the value proportional to the logarithm of photocurrent Ipd.

As described above, voltage supply circuit VS3 and resistance R11 have the temperature coefficients nearly equal to zero so that the temperature coefficient of the output current of constant current supply circuit IS3, i.e., the temperature coefficient of V3/Rb is nearly zero. Owing to this structure, it is possible to suppress temperature-change in output current Iout over a wide temperature range.

As described above, the temperature coefficient of the voltage produced by voltage supply circuit VS3 is set substantially equal to that of resistance Rb over a wide temperature range, and this structure or configuration can likewise suppress the temperature-change in output current Iout over a wide range.

Resistance value Rb of resistance R11 can be adjusted by performing the trimming. Owing to the above structure, it is possible to adjust the inclination of output current Iout on a graph, in which the abscissa gives Ipd on a logarithmic scale, and the ordinate gives output current Iout.

Further, constant voltage supply circuit VS1 is configured such that constant A, i.e., the voltage value of voltage V1 can be adjusting by performing the trimming. This configuration allows adjustment of the offset quantity of output current Iout.

Further, current supply circuit IS1 is configured such that the current value of reference current Iref can be adjusted by performing the trimming. This configuration allows adjustment of the offset quantity of output current Iout.

Similarly to the photocurrent sensing circuit according to the first embodiment of the invention, A, B, V3 and Rb may be arbitrarily determined to satisfy the following relationships;

$$A - \ln(Iref/Ipd\_1lx) = 0$$

$$(V3/(Rb \times B)) \times 2.3025 = 10$$

Thereby, output current Iout is expressed by the following equation:

$$Iout = 10 \times Log(Ev)$$

Therefore, output current Iout can be set ten times larger than the logarithmic value of the illumination.

[Output Circuit 36]

A current mirror circuit formed of P-channel MOS transistors MP1 and MP2 and a current mirror circuit formed of P-channel MOS transistors MP3 and MP4 are cascaded. These two current mirror circuits provide output current Iout in the reverse current direction from output terminal T1.

Figure 4:
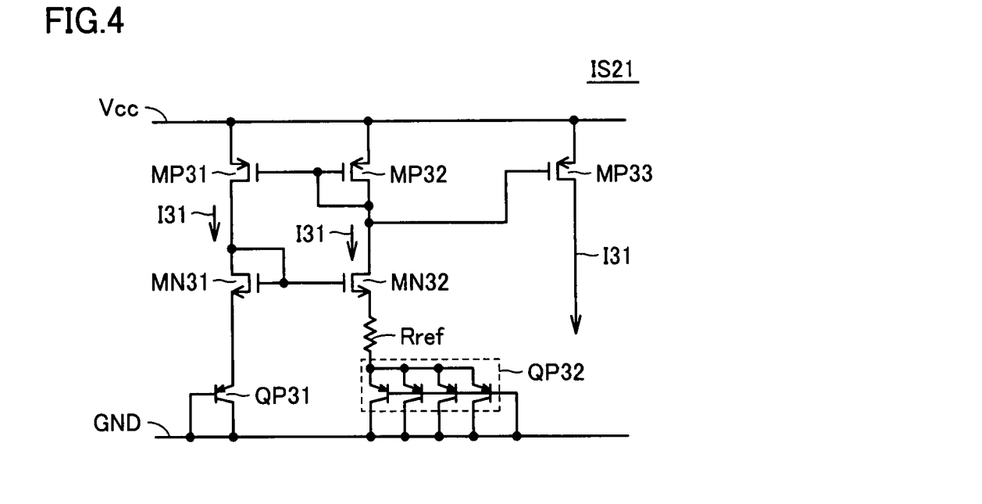
FIG. 4 is a circuit diagram showing a structure of a band gap current supply circuit IS21 according to the third embodiment of the invention.

FIG. 4 is a circuit diagram showing a structure of band gap current supply circuit IS21 according to the third embodiment of the invention. The structure and operation of band gap current supply circuit IS23 are substantially the same as those of band gap current supply circuit IS21.

Referring to FIG. 4, band gap current supply circuit IS21 includes PNP transistors QP31 and QP32, N-channel MOS transistors MN31 and MN32, P-channel MOS transistors MP31-MP33 and a reference resistance Rref. In FIG. 4, PNP transistor QP32 is formed of four PNP transistors. This means that PNP transistor QP32 has a size four times larger than that of PNP transistor QP31.

Since PNP transistor QP32 has the size four times larger than that of PNP transistor QP31, a difference of $(Vt \times \ln 4)$ is present between the base-emitter voltage of PNP transistor QP31 and the base-emitter voltage of PNP transistor QP32.

Since the voltage difference is applied to reference resistance Rref, a current I31 is expressed by the following equation, where Rref represents a resistance value of reference resistance Rref.

$$I31 = Vt \times \ln 4 / Rref$$

N-channel MOS transistors MN31 and MN32 have the same sizes as P-channel MOS transistors MP31-MP33. Therefore, the drain current of each of P-channel MOS transistors MP31-MP33 is equal to current I31.

Therefore, the temperature coefficient of output current I31 of band gap current supply circuit IS21 becomes equal to ((temperature coefficient of Vt)−(temperature coefficient of Rref)).

Referring to FIG. 3 again, resistance R21 has the same temperature coefficient as reference resistance Rref, and passes output current I31. Therefore, the voltage between the opposite ends of resistance R21, i.e., the output voltage of constant voltage supply circuit VS1 is proportional to thermal voltage Vt. Likewise, resistance R22 has the same temperature coefficient as reference resistance Rref, and passes an output current I32. Therefore, the voltage between the opposite ends of resistance R22, i.e., the output voltage of constant voltage supply circuit VS2 is proportional to thermal voltage Vt. The structures of constant voltage supply circuits VS1 and VS2 in the photocurrent sensing circuit according to the first embodiment of the invention are the same as the structure shown in FIG. 4.

Accordingly, the photocurrent sensing circuit according to the third embodiment of the invention can suppress the temperature-change in output current, and can achieve a low cost, similarly to the photocurrent sensing circuit according to the second embodiment.

In the photocurrent sensing circuit according to the second embodiment of the invention, the reference voltages of operational amplifiers AMP1-AMP8, constant current supply circuit IS1 and constant voltage supply circuits VS1-VS3 are equal to the ground voltage. Therefore, operational amplifiers AMP1-AMP9 require both the positive and negative power supplies. However, in the photocurrent sensing circuit according to the third embodiment of the invention, operational amplifiers AMP1-AMP9, constant current supply circuit IS1 and constant voltage supply circuits VS1-VS3 use reference voltage Vref other than the ground voltage. Owing to the above structure, operational amplifiers AMP1-AMP9 can operate with the single power supply, and the photocurrent sensing circuit can have simple structures.

When photocurrent sensing circuit 103 does not include Vref cancellation circuit 37, it is necessary that the collector potential of PNP transistor QP6 in inverse logarithmic transformation circuit 35 must be equal to Vref, and therefore it is necessary to increase a power supply voltage VCC, resulting in increase in circuit scale of the photocurrent sensing circuit. For example, when reference voltage Vref is set to 1 V, the collector potential of PNP transistor QP6 is 1 V. Since the emitter-base voltage of the transistor is generally equal to about 0.7 V, the emitter potential of PNP transistor QP6 becomes equal to 1.7 V (=1 V+0.7 V). For operating N-channel MOS transistor MN1 and P-channel MOS transistors MP1 and MP3 in output circuit 36, the source-drain voltage of each MOS transistor must be 1 V or higher so that power supply voltage VCC must be 2.7 V or higher. Since the power supply voltage generally used in the mobile terminal and the like is 2.5 V or lower, it is impossible to use the photocurrent sensing circuit in the mobile terminal and the like.

However, in the photocurrent sensing circuit according to the third embodiment of the invention, Vref cancellation circuit 37 subtracts reference voltage Vref from output voltage Vh of logarithmic operation circuit 34, and provides a result the subtraction to inverse logarithmic transformation circuit 35. According to this structure, power supply voltage VCC can be reduced by setting the collector potential of PNP transistor QP6 in inverse logarithmic transformation circuit 35 to the ground potential. Thereby, the available range of the photocurrent sensing circuit can be increased.

Yet another embodiment of the invention will now be described with reference to the drawings. In the figures, the same or corresponding portions bear the same reference numbers, and description thereof is not repeated.

Fourth Embodiment

Figure 5:
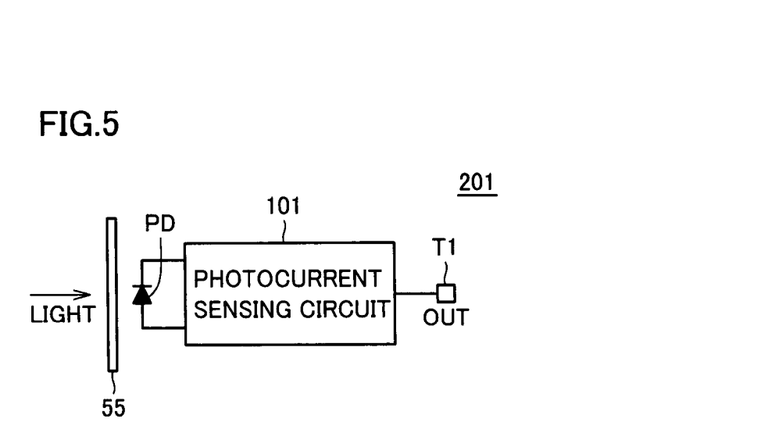
FIG. 5 shows a structure of a photosensor according to a fourth embodiment of the invention.

FIG. 5 shows a structure of a photosensor according to a fourth embodiment of the invention.

Referring to FIG. 5, a photosensor 201 includes a luminosity correction filter 55, light receiving element PD and photocurrent sensing circuit 101.

Light receiving element PD is, e.g., a photodiode, produces photocurrent Ipd proportional to the light that is externally received through luminosity correction filter 55, and provides it to photocurrent sensing circuit 101. Photocurrent sensing circuit 101 receives photocurrent Ipd from light receiving element PD, and provides output current Iout (=10×Log(Ev)) proportional to an illumination EV of the light incident on light receiving element PD.

Owing to the structure provided with luminosity correction filter 55, light receiving element PD can have spectral sensitivity characteristics close to those of human eyes, and light receiving element PD can pass the current proportional to brightness (illumination) sensed by a person. Owing to this structure, photosensor 201 can output the current according to the ambient illumination sensed by the person.

A further another embodiment of the invention will now be described with reference to the drawings. In the figures, the same or corresponding portions bear the same reference numbers, and description thereof is not repeated.

Fifth Embodiment

Figure 6:
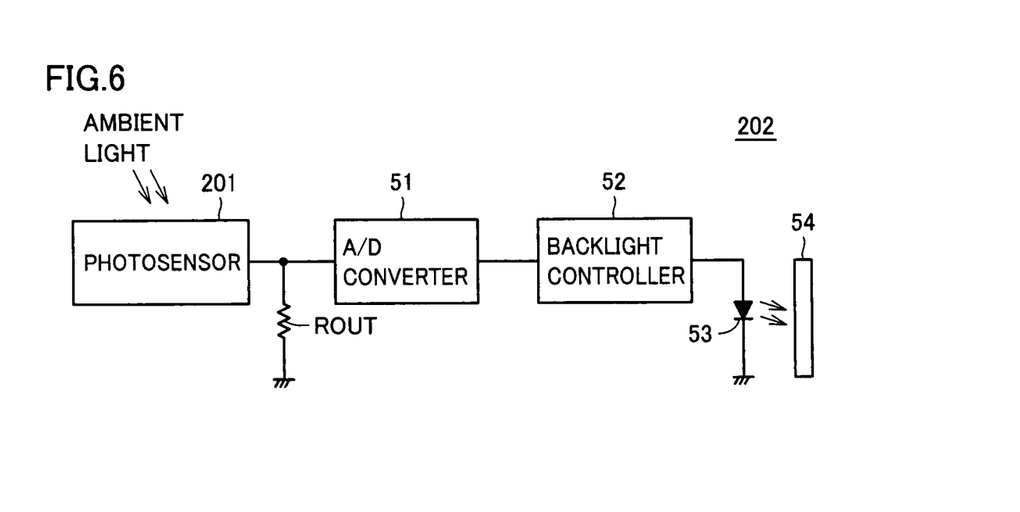
FIG. 6 shows a structure of an electronic device according to a fifth embodiment of the invention.

FIG. 6 shows a structure of an electronic device according to a fifth embodiment of the invention.

Referring to FIG. 6, an electronic device 202 includes photosensor 201, an output resistance ROUT, an A/D converter 51, a backlight controller 52, a light emitting element 53 and an liquid crystal panel 54.

Photosensor 201 provides a current depending on the illumination of the ambient light to output resistance ROUT. Output resistance ROUT converts the current received from photosensor 201 into a voltage. A/D converter 51 converts the voltage received from output resistance ROUT into a digital value. Backlight controller 52 drives light emitting element 53 based on the digital value received from A/D converter 51. Light emitting element 53 is, e.g., a white LED, and emits the light to liquid crystal panel 54.

For example, when an ambient brightness is low, electronic device 202 increases the brightness of backlight, i.e., light emitting element 53. When the ambient brightness is high, electronic device 202 lowers its brightness. This structure can improve the visibility of the LCD screen. Also, the backlight can be finely adjusted according to the ambient brightness to increase the battery life of the electronic device such as a mobile device.

Although the present invention has been described and illustrated in detail, it is clearly understood that the same is by way of illustration and example only and is not to be taken by way of limitation, the scope of the present invention being interpreted by the terms of the appended claims.

What is claimed is:

1. The photocurrent sensing circuit comprising:
a first logarithmic compression circuit including a diode, and logarithmically compressing a photocurrent received from a light receiving element to convert said photocurrent into a voltage, using said diode;
a cancellation circuit logarithmically compressing a current substantially equal in temperature coefficient of said photocurrent to convert said current into a voltage, and performing an addition or a subtraction on said converted voltage and the voltage converted by said first logarithmic compression circuit to output a resultant voltage;
a logarithmic operation circuit logarithmically compressing the resultant voltage received from said cancellation circuit to produce a first voltage, logarithmically compressing a voltage proportional to a thermal voltage of said photocurrent to produce a second voltage, logarithmically compressing a current having thermal dependence of nearly zero to produce a third voltage and performing an addition or a subtraction of each of said second and third voltages with respect to said first voltage to produce a fourth voltage; and
an inverse logarithmic transformation circuit performing inverse logarithmic transformation on said fourth voltage to output a current.

2. The photocurrent sensing circuit according to claim 1, wherein said cancellation circuit includes:
a first current supply circuit producing a reference current having a temperature coefficient substantially equal to that of said photocurrent,
a second logarithmic compression circuit logarithmically compressing said reference current to covert said reference current into a voltage, and
a first operation circuit performing an addition or a subtraction on the voltage converted by said first logarithmic compression circuit and the voltage converted by said second logarithmic compression circuit.

3. The photocurrent sensing circuit according to claim 2, wherein
said cancellation circuit further includes a first voltage supply circuit producing a voltage proportional to the thermal voltage of said diode, and
said first operation circuit performs an addition or a subtraction on the voltage converted by said second logarithmic compression circuit and the voltage proportional to the thermal voltage of said diode, and performs an addition or a subtraction on a result of said addition or said subtraction and the voltage converted by said first logarithmic compression circuit.

4. The photocurrent sensing circuit according to claim 2, wherein
said first current supply circuit can adjust a current value of said reference current by performing trimming.

5. The photocurrent sensing circuit according to claim 1, wherein
said logarithmic operation circuit includes a third logarithmic compression circuit logarithmically compressing the resultant voltage received from said cancellation circuit to produce said first voltage,
a second voltage supply circuit producing a voltage proportional to the thermal voltage of said diode,
a current converting circuit converting the voltage produced by said second voltage supply circuit into a current,
a fourth logarithmic compression circuit logarithmically compressing the current converted by said current converting circuit to convert said converted current into said second voltage,
a second operation circuit performing an addition or a subtraction on said first voltage produced by said third logarithmic compression circuit and said second voltage converted by said fourth logarithmic compression circuit to output a resultant voltage,
a second current supply circuit producing a current having a temperature coefficient of nearly zero,
a fifth logarithmic compression circuit logarithmically compressing the current produced by said second current supply circuit to convert said produced current into said third voltage, and
a third operation circuit performing an addition or a subtraction on the resultant voltage received from said second operation circuit and said third voltage converted by said fifth logarithmic compression circuit to produce said fourth voltage.

6. The photocurrent sensing circuit according to claim 5, wherein
said second current supply circuit includes:
a third voltage supply circuit producing a voltage, and
a resistance converting the voltage produced by said third voltage supply circuit into a current; and
the temperature coefficient of the voltage produced by said third voltage supply circuit is substantially equal to the temperature coefficient of said resistance.

7. The photocurrent sensing circuit according to claim 6, wherein
the resistance value of said resistance can be adjusted by trimming.

8. The photocurrent sensing circuit according to claim 1, wherein
said logarithmic operation circuit includes an inclination adjusting circuit adjusting a degree of change in said output current of said inverse logarithmic transformation circuit with respect to changes in said photocurrent.

9. The photocurrent sensing circuit according to claim 1, wherein
said inverse logarithmic transformation circuit includes:
a diode,
an operational amplifier receiving on its first input terminal said fourth voltage from said logarithmic operation circuit, and
a transistor receiving on its control electrode an output of said operational amplifier, and connected at one of its conductive electrodes to said diode and a second input terminal of said operational amplifier.

10. The photocurrent sensing circuit according to claim 1, wherein
said first logarithmic compression circuit includes an operational amplifier,
said cancellation circuit includes a voltage supply circuit, a current supply circuit and an operational amplifier,
said logarithmic operation circuit includes a voltage supply circuit, a current supply circuit and an operational amplifier,
a reference voltage of each of said operational amplifiers, said voltage supply circuits and said current supply circuits is a voltage other than a ground voltage,
said photocurrent sensing circuit further comprises a reference voltage cancellation circuit subtracting said reference voltage from said fourth voltage produced by said logarithmic operation circuit to output a resultant voltage to said inverse logarithmic transformation circuit, and
said inverse logarithmic transformation circuit performs inverse logarithmic transformation on the resultant voltage received from said reference voltage cancellation circuit to output the current.

11. A photosensor comprising:
a light receiving element outputting a photocurrent depending on a quantity of received light; and
a photocurrent sensing circuit, wherein
said photocurrent sensing circuit includes:
a first logarithmic compression circuit including a diode, and logarithmically compressing said photocurrent received from said light receiving element to convert said photocurrent into a voltage, using said diode,
a cancellation circuit logarithmically compressing a current substantially equal in temperature coefficient of said photocurrent to convert said current into a voltage, and performing an addition or a subtraction on said converted voltage and the voltage converted by said first logarithmic compression circuit to output a resultant voltage,
a logarithmic operation circuit logarithmically compressing the resultant voltage received from said cancellation circuit to produce a first voltage, logarithmically compressing a voltage proportional to a thermal voltage of said photocurrent to produce a second voltage, logarithmically compressing a current having thermal dependence of nearly zero to produce a third voltage and performing an addition or a subtraction of each of said second and third voltages with respect to said first voltage to produce a fourth voltage, and
an inverse logarithmic transformation circuit performing inverse logarithmic transformation on said fourth voltage to output a current.

12. An electronic device comprising:
a light receiving element outputting a photocurrent depending on a quantity of received light; and
a photocurrent sensing circuit, wherein
said photocurrent sensing circuit including:
a first logarithmic compression circuit including a diode, and logarithmically compressing said photocurrent received from said light receiving element to convert said photocurrent into a voltage, using said diode,
a cancellation circuit logarithmically compressing a current substantially equal in temperature coefficient of said photocurrent to convert said current into a voltage, and performing an addition or a subtraction on said converted voltage and the voltage converted by said first logarithmic compression circuit to output a resultant voltage,
a logarithmic operation circuit logarithmically compressing the resultant voltage received from said cancellation circuit to produce a first voltage, logarithmically compressing a voltage proportional to a thermal voltage of said photocurrent to produce a second voltage, logarithmically compressing a current having thermal dependence of nearly zero to produce a third voltage and performing an addition or a subtraction of each of said second and third voltages with respect to said first voltage to produce a fourth voltage, and
an inverse logarithmic transformation circuit performing inverse logarithmic transformation on said fourth voltage to output a current.

* * * * *